Feb. 10, 1925.

W. V. LA RUE 1,526,001

LIQUID FUEL DELIVERY APPARATUS

Filed Feb. 8, 1924

Inventor:
William V. La Rue
By Louis C. Vanderlip.
Att'y.

Patented Feb. 10, 1925.

1,526,001

UNITED STATES PATENT OFFICE.

WILLIAM V. LA RUE, OF GOSHEN, INDIANA.

LIQUID-FUEL-DELIVERY APPARATUS.

Application filed February 8, 1924. Serial No. 691,470.

*To all whom it may concern:*

Be it known that I, WILLIAM V. LA RUE, a citizen of the United States, residing in the city of Goshen, county of Elkhart, and State of Indiana, have invented certain new and useful Improvements in Liquid-Fuel-Delivery Apparatus, of which the following is a specification.

This invention relates to liquid fuel pumps for supplying gasoline, or other liquid fuel, to motor cars equipped with internal combustion engines.

The present structure of liquid fuel pumps used at automobile filling stations includes a flexible conduit, or hose, one end whereof is connected with the fuel discharge pipe of the fuel pump, the other end of said hose being adapted to be inserted in the intake opening of the fuel tank of the motor car to fill the latter when the pump is operated. In such a device a portion of the gasoline, or liquid fuel, remains in the sagging supply hose after the fuel pump has ceased to operate and the operator is compelled to manually elevate the hose and to hold it thus for a short time to permit the fuel residue therein to drain into the motor car fuel tank. This is repeated many times every day by the operator and much time lost during the busy seasons, and frequently the drainage of the fuel from the hose is incomplete when the nozzle thereof is removed from the motor car fuel tank and the remaining fuel is deposited upon the floor of the filling station, whereby many destructive fires result.

The principal object of this invention is to provide means for quickly expelling the liquid fuel residue from the supply hose of a device of the character described after the fuel pump has ceased to operate. Another object of the invention is to provide fluid pressure means to expel the liquid fuel residue from the supply hose of a device of the character described after the fuel pump has ceased to operate.

Figure 1:
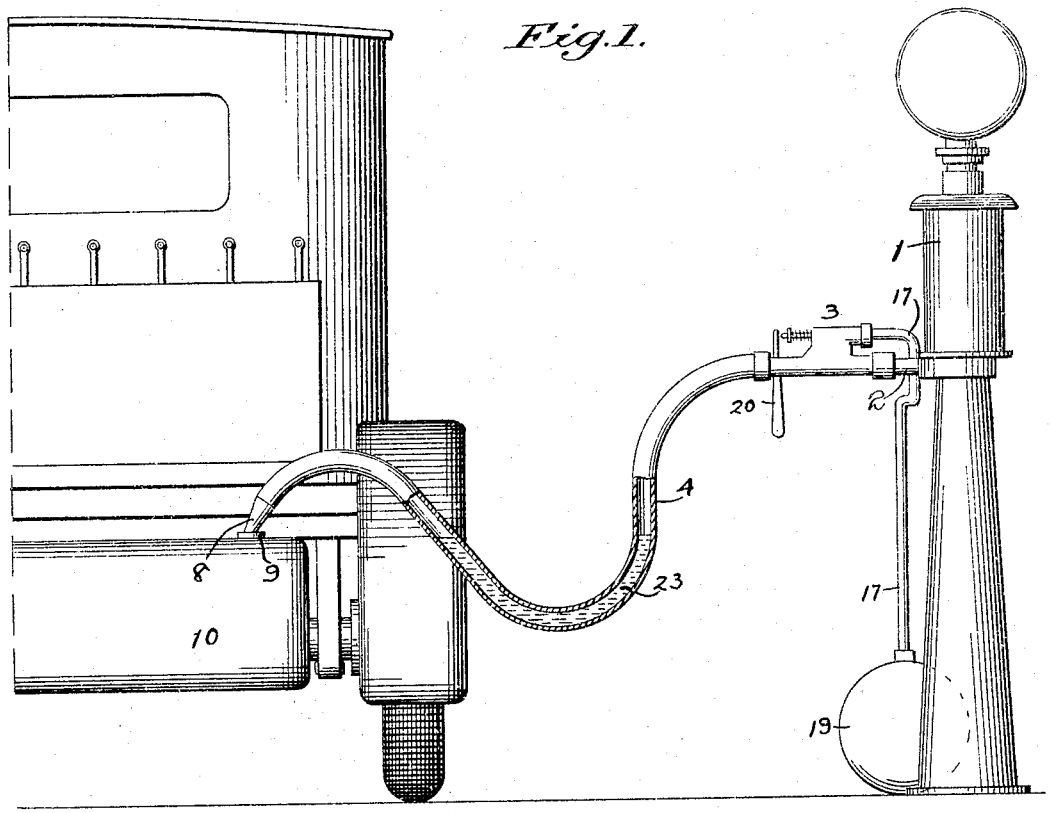
Figure 2:
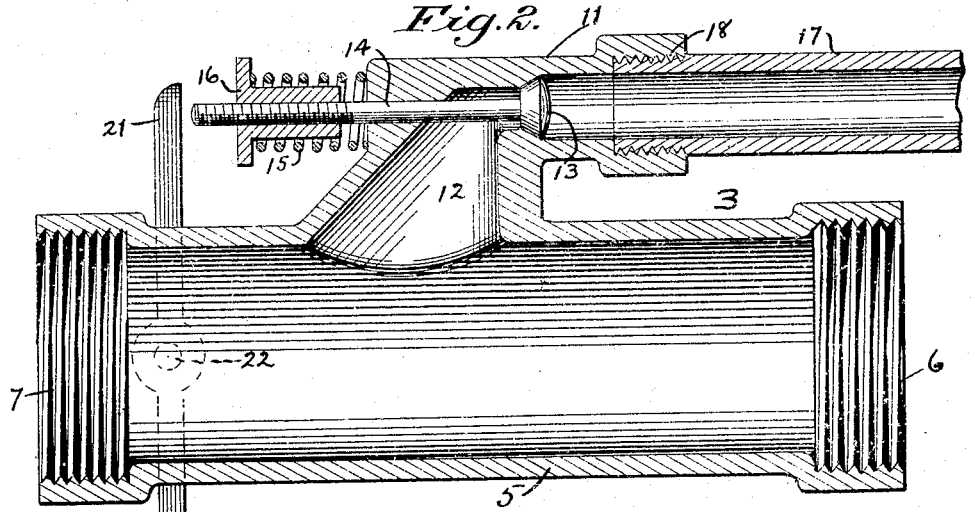

The preferred embodiment of my invention is illustrated in the accompanying drawing in which Figure 1 is a view in elevation of a liquid fuel filling station pump illustrating the application of my invention thereto, the supply hose being partially in section to disclose the fuel residue therein; and Figure 2 is an enlarged view in section of the compressed air valve used in the invention.

Similar numerals of reference indicate like parts throughout the several views on the drawing.

Referring to the details of the drawing the numeral 1 indicates a liquid fuel pump of the common type used at automobile filling stations for supplying gasoline to motor cars and operated in any suitable manner, said pump being provided with the discharge pipe 2 to which the usual supply hose is connected in present practice. My invention contemplates the connection of the valve 3 with the pump pipe 2 and the connection of the supply hose 4 with the opposite end of the valve 3. For this purpose the valve 3 is provided with the tubular body portion 5 and the inlet and outlet openings 6 and 7, respectively, the end 6 being adapted to be screwed to the pipe 2, and the end 7 being adapted to receive the threaded end of the hose 4, whereby the liquid fuel passes directly through the valve body 5 into the hose 4 from the pump 1 when the latter is operated. The supply hose 4 is provided with the usual nozzle 8 adapted to be inserted in the intake opening 9 of the motor car fuel tank 10, as is well known, to enable the passage of the liquid fuel from the pump 1 to said fuel tank.

The valve body 5 is provided with the branch portion 11 which has the chamber 12 in communication with the interior of the fuel conduit chamber of 5, and a valve 13 is mounted in said branch to close the farther end of the chamber 12, said valve having a stem 14 which extends to the exterior of the branch 11 and may have the nut 16 screw threaded thereon. A coil spring 15 may engage the nut 16 and bear against same to normally close the valve 13. A compressed air supply pipe 17 is connected with the branch 11 at 18 and may be connected with a tank or container 19 which contains compressed air received from any suitable source. A manually operable handle 20 is pivotally mounted on the exterior of the valve body at 22 and may have the extension 21 adapted to be forced into engagement with the end of the valve stem 14 for opening the valve 13 to admit compressed air from the pipe 17 to the chamber 12.

As illustrated in Fig. 1 of the drawing the hose 4 is in its natural sagging position when the pump 1 has ceased to operate, in which position the fuel residue 23 remains therein. To quickly expel the fuel residue 23 from the hose 4 the operator admits compressed air to the valve branch chamber 12, as described, and the fuel residue is promptly discharged from the hose into the tank 10. effectually draining said hose in a moment's time.

The spring seat nut 16, being screw threaded upon the valve steam 14, is adjustable thereon, whereby the degree of valve opening may be regulated.

I claim:—

In combination, a liquid fuel pump, a hollow member connected at one end with the discharge pipe of said pump and a flexible delivery conduit connected with the other end, said hollow member having a valve controlled inlet passage connected with a source of air under pressure for permitting air to be admitted to expel the residue of liquid from the delivery conduit.

In witness whereof I have hereunto affixed my signature this 25th day of January, 1924.

WILLIAM V. LA RUE.